(12) United States Patent
Codilian

(10) Patent No.: US 6,690,637 B1
(45) Date of Patent: Feb. 10, 2004

(54) DISK DRIVE INCLUDING DISK CLAMP WITH NON-SYMMETRIC ENGAGED FASTENER HOLES AND FASTENER TORQUE

(75) Inventor: Raffi Codilian, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 140 days.

(21) Appl. No.: 10/022,155

(22) Filed: Dec. 14, 2001

(51) Int. Cl.⁷ ............................................. G11B 17/02
(52) U.S. Cl. .................................................. 369/99.12
(58) Field of Search ........................ 360/99.12, 99.05, 360/99.08, 97.02, 98.08; 369/75.2, 75.1; 219/121.68

(56) References Cited

U.S. PATENT DOCUMENTS

| | | | |
|---|---|---|---|
| 5,296,981 A | | 3/1994 | Ogawa ..................... 360/99.08 |
| 5,528,434 A | | 6/1996 | Bronshvatch et al. .... 360/99.08 |
| 5,790,346 A | * | 8/1998 | Fletcher ................... 360/99.12 |
| 5,822,151 A | * | 10/1998 | Albrecht et al. ......... 360/98.08 |
| 5,877,571 A | * | 3/1999 | Brooks .................... 360/99.12 |
| 5,880,906 A | * | 3/1999 | Lindrose ................... 360/98.08 |
| 6,028,739 A | * | 2/2000 | Lindrose ................... 360/99.12 |
| 2002/0024762 A1 | * | 2/2002 | Renken ..................... 360/99.12 |
| 2002/0040891 A1 | * | 4/2002 | Hong et al. ............. 219/121.68 |
| 2002/0067569 A1 | * | 6/2002 | Choo et al. ............... 360/98.08 |
| 2002/0071203 A1 | * | 6/2002 | Nakamoto et al. ........ 360/97.02 |
| 2002/0109939 A1 | * | 8/2002 | Schwandt et al. ....... 360/99.12 |

* cited by examiner

*Primary Examiner*—Tianjie Chen
(74) *Attorney, Agent, or Firm*—Won Tae C. Kim, Esq.; Milad G. Shara, Esq.; Stetina Brunda Garred & Brucker

(57) ABSTRACT

An aspect of the invention can be regarded as a disk drive that includes a disk drive base and a spindle motor hub. The disk drive includes a disk disposed about the spindle motor hub and including a disk surface. The disk drive includes a plurality of fasteners. The disk drive includes a disk clamp attached to the spindle motor hub in mechanical communication with the disk surface for securing the disk. The disk clamp includes a plurality of engaged fastener holes formed through the disk clamp and non-symmetrically distributed about an axis of rotation. The fasteners are engaged within the engaged fastener holes for attachment of the disk clamp and the disk to the spindle motor hub. According to another aspect of the present invention, fasteners are non-uniformly torqued within fastener openings for applying a non-symmetric clamping force by the disk clamp against the disk.

8 Claims, 2 Drawing Sheets

DISK DRIVE INCLUDING DISK CLAMP WITH NON-SYMMETRIC ENGAGED FASTENER HOLES AND FASTENER TORQUE

CROSS-REFERENCE TO RELATED APPLICATIONS

Not applicable.

BACKGROUND OF THE INVENTION

1. Field of the Invention

The present invention relates generally to disk drives, and in particular to a disk drive including a disk clamp with non-symmetric engaged fastener holes and a disk drive with non-uniformly torqued fasteners engaged with the disk clamp.

2. Description of the Prior Art

The typical hard disk drive includes a head disk assembly (HDA) and a printed circuit board assembly (PCBA) attached to a disk drive base of the HDA. The head disk assembly includes the disk drive base, a cover, at least one magnetic disk, a spindle motor for rotating the disk, and a head stack assembly (HSA).

The spindle motor includes a spindle motor hub that is rotatably attached to the disk drive base. The spindle motor hub has an outer hub flange that supports a lowermost one of the disks. Additional disks may be stacked and separated with annular disk spacers that are disposed about the spindle motor hub. A disk clamp is affixed about the spindle motor hub. Fasteners, such as screws, are disposed through fastener holes of the disk clamp and engage fastener openings that are circumferentially spaced about a periphery of the spindle motor hub for applying a clamping force by the disk clamp against the topmost disk to secure all of the disks to the spindle motor hub. The spindle motor typically includes a spindle motor base that is attached to the disk drive base. A shaft is coupled to the spindle motor base and the spindle motor hub surrounds the shaft. The spindle motor hub may be rotatably coupled to the shaft, and therefore the spindle motor base, typically via a pair of bearing sets. A stator is positioned about the shaft and is attached to the spindle motor base. A magnet element is attached to the hub flange. The stator includes windings that selectively conduct current to create a magnetic field that interacts with the various poles of the magnet element. Such interaction results in forces applied to the spindle motor hub that tend to rotate the spindle motor hub and the attached disks.

The head stack assembly has an actuator assembly having at least one head or slider, typically several, for reading and writing data to and from the disk. The printed circuit board assembly includes a servo control system in the form of a disk controller for generating servo control signals. The head stack assembly is controllably positioned in response to the generated servo control signals from the disk controller. In so doing, the attached sliders are moved relative to tracks disposed upon the disk.

The head stack assembly includes the actuator assembly and a flex circuit cable assembly that are attached to the actuator assembly. A conventional "rotary" or "swing-type" actuator assembly typically comprises an actuator body, a pivot bearing cartridge, a coil portion that extends from one side of the actuator body to interact with one or more permanent magnets to form a voice coil motor, and one or more actuator arms which that extend from an opposite side of the actuator body. The actuator body includes a bore and the pivot bearing cartridge engaged within the bore for allowing the actuator body to rotate between limited positions. At least one head gimbal assembly (HGA) is distally attached to each of the actuator arms. A head gimbal assembly includes a head for reading and writing data to and from the disks. In this regard, the actuator assembly is controllably rotated so as to move the heads relative to the disks for reading and writing operations with respect to the tracks contained on the disks.

The above described disk clamp arrangement for securing the disks gives rise to certain problems associated with the clamping force of the disk clamp and the thickness and strength of the disk clamp and disks. It is contemplated that the fasteners each include a fastener head that engages the disk clamp at the fastener holes. Fastener shanks extend from the fastener heads through the fastener holes of the disk clamp and engage the spindle motor hub. A majority of the clamping force applied to the disks is concentrated at locations immediately radially adjacent to the fastener holes. A measurably less amount of clamping force is applied to those portions of the disks at angular positions between the fastener holes. The clamping force as applied to the disks is observed to be sinusoidal in nature with peak values commonly occurring immediately radially adjacent the fastener holes and minimal values commonly occurring at positions intermediate adjacent ones of the fastener holes. This variation in clamping forces can cause the disks to become mechanically distorted in a repeating manner angularly about the disks.

Distortion of the disks from an ideal flat condition leads to a phenomenon referred to "repeatable run-out" associated with an undesirable modulation of read/write signals detected and produced by the heads of the disk drive. Accordingly, there is a need in the art for an improved disk drive in comparison to the prior art.

SUMMARY OF THE INVENTION

An aspect of the invention can be regarded as a disk drive that includes a disk drive base and a spindle motor hub rotatably coupled to the disk drive base. The disk drive further includes a disk disposed about the spindle motor hub and including a disk surface. The disk drive further includes a plurality of fasteners. The disk drive further includes a disk clamp attached to the spindle motor hub in mechanical communication with the disk surface for securing the disk. The disk clamp includes a plurality of engaged fastener holes formed through the disk clamp and non-symmetrically distributed about an axis of rotation. The engaged fastener holes are sized and configured to respectively receive the fasteners. The fasteners are engaged within the engaged fastener holes for attachment of the disk clamp and the disk to the spindle motor hub.

According to various embodiments of the present invention, the engaged fastener holes may be radially uniformly disposed from the axis of rotation. In another arrangement, the engaged fastener holes may be radially non-uniformly disposed from the axis of rotation. The engaged fastener holes may each be disposed a radial distance from the axis of rotation within ten percent of a nominal radial distance of all of the engaged fastener holes from the axis of rotation. The engaged fastener holes may be disposed angularly non-uniformly about the axis of rotation. Adjacent pairs of the engaged fastener holes may each be disposed an angular distance with respect to the axis of rotation within fifteen percent of a nominal angular distance of all of the engaged fastener holes with respect to the axis of rotation. The spindle motor hub may include a plurality of threaded fastener openings aligned with the engaged fastener holes of the disk clamp for respectively engaging the fasteners for attachment of the disk clamp to the spindle motor hub.

Another aspect of the invention can be regarded as a disk drive that includes a disk drive base and a spindle motor hub rotatably coupled to the disk drive base. The disk drive further includes a spindle motor hub rotatably coupled to the disk drive base. The spindle motor hub includes a plurality of threaded fastener openings. The disk drive further includes a disk disposed about the spindle motor hub. The disk drive further includes a disk clamp attached to the spindle motor hub for securing the disk. The disk clamp includes a plurality of engaged fastener holes formed through the disk clamp and aligned with the fastener openings of the spindle motor hub. The disk drive further includes a plurality of fasteners respectively disposed through the engaged fastener holes for attaching the disk clamp and disk to the spindle motor hub. The fasteners are non-uniformly torqued within the fastener openings for applying a non-symmetric clamping force by the disk clamp against the disk.

DESCRIPTION OF THE PREFERRED EMBODIMENTS

Figure 1:
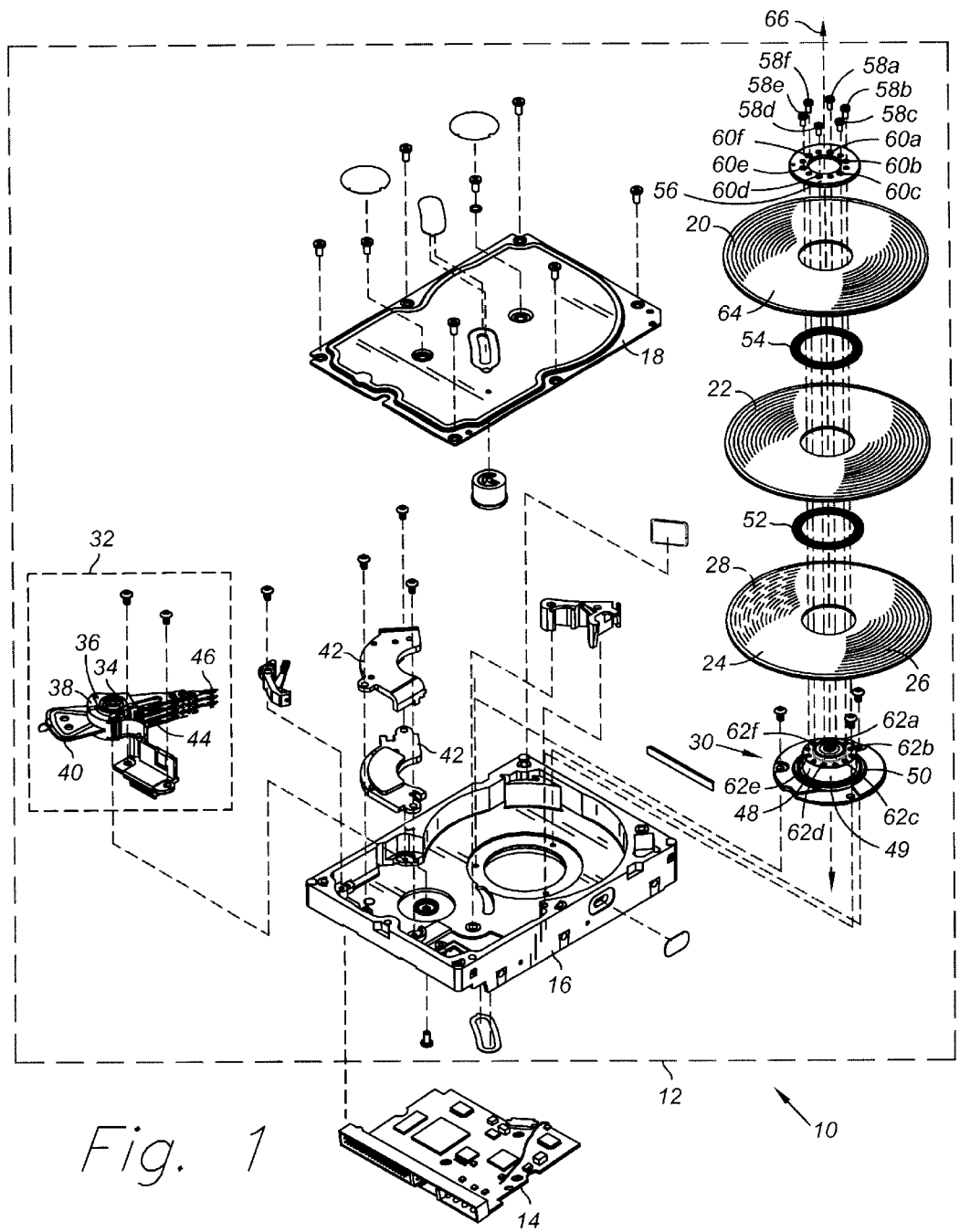
FIG. 1 is an exploded perspective view of a disk drive as constructed in accordance with aspects of the present invention.
Figure 2:
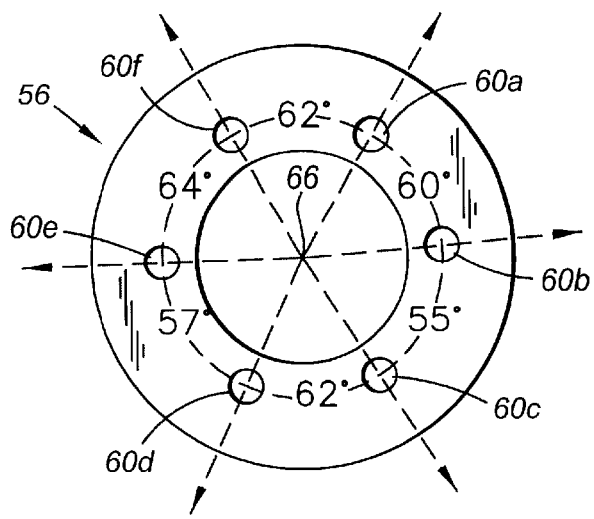
FIG. 2 is a top view of a disk clamp of the disk drive of FIG. 1.
Figure 3:
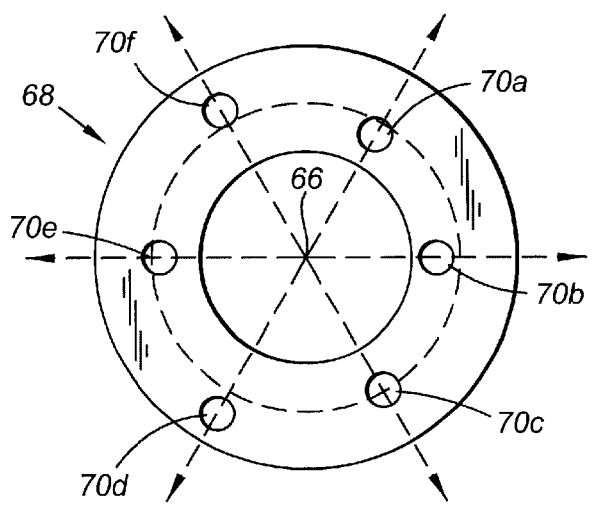
FIG. 3 is a top view of a disk clamp according to another embodiment of the present invention.

Referring now to the drawings wherein the showings are for purposes of illustrating preferred embodiments of the present invention only, and not for purposes of limiting the same, FIGS. 1–3 illustrate a disk drive in accordance with the aspects of the present invention.

Referring now to FIG. 1 there is depicted an exploded perspective view of a disk drive 10 constructed in accordance with an aspect of the present invention. In the embodiment shown, the disk drive 10 includes a head disk assembly (HDA) 12 and a printed circuit board assembly (PCBA) 14. The head disk assembly 12 includes a disk drive base 16 and a cover 18 that collectively house magnetic disks 20, 22, 24. Each magnetic disk 20, 22, 24 contains a plurality of tracks for storing data. The magnetic disks 20, 22, 24 may be two-sided, and thus for example, the magnetic disk 24 is shown having a track 26 on an upper facing side and a track 28 (shown in phantom) on a lower facing side. The head disk assembly 12 further includes a spindle motor 30 for rotating the magnetic disks 20, 22, 24. The head disk assembly 12 further includes a head stack assembly 32 and a pivot bearing cartridge 34. The head stack assembly 32 includes a rotary actuator 36.

The rotary actuator 36 includes an actuator body 38 that has a bore and the pivot bearing cartridge 34 engaged within the bore for facilitating the rotary actuator 36 to rotate between limited positions. The rotary actuator 36 further includes a coil portion 40 that extends from one side of the actuator body 38 to interact with a pair of permanent magnets 42 to form a voice coil motor for pivoting the rotary actuator 36. A plurality of actuator arms, the lowermost one of which being denoted 44, extend from an opposite side of the actuator body 38. As the disks 20, 22, 24 may be two sided, each of the actuator arms include either one or two head gimbal assemblies associated with the adjacent sides of the disks 20, 22, 24. Each head gimbal assembly includes a head (the uppermost one being denoted 46) for reading and writing data to and from the disks 20, 22, 24.

The spindle motor 30 includes a spindle motor hub 48 that is rotatably attached to the disk drive base 16. The spindle motor hub 48 has a hub body 49 and a hub flange 50 that extends from the hub body 49 to support a lowermost one of the disks, namely disk 24. The remaining disks 22, 20 are stacked and separated with annular disk spacers 52, 54 that are disposed about the hub body 49. A disk clamp 56 is attached about the spindle motor hub 48 and is utilized to apply a clamping force against the topmost disk 20 for securing all the disks 20, 22, 24 to the spindle motor hub 48. The spindle motor 30 typically includes a spindle motor base that is attached to the disk drive base 12. A shaft is coupled to the spindle motor base and the spindle motor hub 48 surrounds the shaft. The spindle motor hub 48 may be rotatably coupled to the shaft and therefore the spindle motor base typically via a pair of bearing sets. A stator is positioned about the shaft and is attached to the spindle motor base. A magnet element is attached at bottom portion of the hub flange 50. The stator includes windings that selectively conduct current to create a magnetic field that interacts with the various poles of the magnet element. Such interaction results in forces applied to the spindle motor hub 48 that tend to rotate the spindle motor hub 48 and the attached disks 20, 22, 24.

An aspect of the invention can be regarded as the disk drive 10 that includes the disk drive base 16 and the spindle motor hub 48 that is rotatably coupled to the disk drive base 16. The disk drive 10 further includes the disk 20 disposed about the spindle motor hub 48 and including a disk surface 64. The disk drive 10 further includes a plurality of fasteners 58a–f which take the form of screws. The disk drive 10 further includes the disk clamp 56 attached to the spindle motor hub 48 in mechanical communication with the disk surface 64 for securing the disk 20. The disk clamp 56 includes a plurality of engaged fastener holes 60a–f formed through the disk clamp 56 and non-symmetrically distributed about an axis of rotation 66. As used herein the term "non-symmetrically distributed" is used to denote that which is beyond normal manufacturing tolerances and is designed as such. The engaged fastener holes 60a–f are sized and configured to respectively receive the fasteners 58a–f. The fasteners 58a–f are engaged within the engaged fastener holes 60a–f for attachment of the disk clamp 56 and the disk 20 to the spindle motor hub 48. In addition, the spindle motor hub 48 may include a plurality of threaded fastener openings 62a–f aligned with the engaged fastener holes 60a–f of the disk clamp 56 for respectively engaging the fasteners 58a–f for attachment of the disk clamp 56 to the spindle motor hub 48. Thus, the disks 20, 22, 24 and the disk spacers 52 and 54 are compressed between the disk clamp 56 and the hub flange 50.

The non-symmetric distribution of the engaged fastener holes 60a–f is contemplated to vary the location and amplitude of the clamping force applied to the disk 20 from having an otherwise well defined repeating sinusoidal shape when observed circumferentially about the disk 20. This variance of the clamping force results in a variance of the mechanical distortion of the disk 20 due to the clamping force. As such, the repeating nature of the clamping force at exact angular positions and amounts is modified, and therefore the repeatable run-out phenomenon is mitigated.

Referring additionally to FIG. 2, there is depicted an enlarged top view of an embodiment of the disk clamp 56. In the embodiment shown, the engaged fastener holes 60a–f are radially uniformly disposed from the axis of rotation 66. However, the engaged fastener holes 60a–f are disposed angularly non-uniformly about the axis of rotation 66. In this respect the engaged fastener holes 60a–f are non-symmetrically distributed about an axis of rotation 66. It is understood that additional or few of the fasteners 58a–f and engaged fastener holes 60a–f may be implemented. For example, in a prior art six fastener configuration, an angularly uniform distribution would include the engaged fastener holes 60a–f to be distributed at sixty degree intervals. As shown however, the engaged fastener holes 60a–f are non-symmetrically distributed at angular intervals with respective values of 60, 55, 62, 57, 64 and 62 degrees as an example. Preferably, adjacent pairs of the engaged fastener holes 60a–f are each disposed at an angular distance or interval with respect to the axis of rotation 66 within fifteen percent of a nominal angular distance or interval of all of the engaged fastener holes 60a–f with respect to the axis of rotation 66. For example, a nominal angular interval of a six fastener arrangement is sixty degrees, and a fifteen percent variance would be plus or minus nine degrees. Thus, the angular intervals would preferably range from fifty one to sixty nine degrees. In addition, though not shown, additional holes may be formed though the disk clamp 56. For example, a combination of such additional holes and the engaged fastener holes 60a–f may be uniformly and symmetrically distributed about the axis of rotation 66. In this regard, the engaged fastener holes 60a–f would nonetheless be non-symmetrically distributed in nature.

Referring now to FIG. 3, there is depicted another embodiment of a disk clamp 72. In this embodiment, engaged fastener holes 74a–f formed in the disk clamp that are radially non-uniformly disposed from the axis of rotation 66. In this respect the engaged fastener holes 74a–f are non-symmetrically distributed about an axis of rotation 66. Preferably, the engaged fastener holes 74a–f are each disposed at a radial distance from the axis of rotation within ten percent of a nominal radial distance of all of the engaged fastener holes from the axis of rotation (as indicated by the dashed line circle). For example, a nominal radial distance may be on the order of ten millimeters, and a variance of ten percent would be plus or minus one millimeter. Thus, the various radial distances from the axis of rotation 66 to the center of each of the engaged fastener holes 74a–f would preferably range from nine to eleven millimeters.

Referring again to FIG. 1, according to another aspect of the present invention, there is provided the disk drive 10 that includes the disk drive base 16 and the spindle motor hub 48 that is rotatably coupled to the disk drive base 16. The spindle motor hub 48 includes the plurality of threaded fastener openings 62a–f. The disk drive 10 further includes the disk 20 disposed about the spindle motor hub 48. The disk drive 10 further includes the disk clamp 56 attached to the spindle motor hub 48 for securing the disk 20. The disk clamp 56 includes a plurality of engaged fastener holes 60a–f formed through the disk clamp 56 and aligned with the fastener openings 62a–f of the spindle motor hub 48. The disk drive 10 further includes the plurality of fasteners 58a–f respectively disposed through the engaged fastener holes 60a–f for attaching the disk clamp 56 and disk 20 to the spindle motor hub 48. The fasteners 58a–f are non-uniformly torqued within the fastener openings 62a–f for applying a non-symmetric clamping force by the disk clamp 56 against the disk 20. As used herein the term "non-uniformly torqued" is used to denote that which is beyond normal manufacturing tolerances and is designed as such. For example, a nominal value of the amount of torque of a given one of the fasteners 58a–f may be on the order of three inch-lbs. with a tolerance of plus or minus one inch-lbs., and the fasteners 58a–f are preferably torqued to within fifty percent of a nominal amount. In another embodiment, the fasteners 58a–f may be torqued to have a variance but within one hundred percent of a nominal amount. Additionally, the non-uniformly torqued nature of the fasteners may be achieved via selective specification of differing tolerances of the torque of the fasteners 58a–f.

The non-uniformly torqued fasteners 58a–f is contemplated to vary the amplitude of the clamping force applied to the disk 20 from having an otherwise well defined repeating sinusoidal shape when observed circumferentially about the disk 20. This variance of the clamping force results in a variance of the mechanical distortion of the disk 20 due to the clamping force. As such, the repeating nature of the clamping force at exact angular positions and amounts is modified, and therefore the repeatable run-out phenomenon is mitigated.

I claim:

1. A disk drive comprising:

a disk drive base;

a spindle motor hub rotatably coupled to the disk drive base;

a disk disposed about the spindle motor hub and including a disk surface;

a plurality of fasteners; and a disk clamp attached to the spindle motor hub in mechanical communication with the disk surface for securing the disk, the disk clamp including a plurality of engaged fastener holes formed through the disk clamp and non-symmetrically distributed about an axis of rotation, the engaged fastener holes being sized and configured to respectively receive the fasteners, the fasteners being engaged within the engaged fastener holes for attachment of the disk clamp and the disk to the spindle motor hub.

2. The disk drive of claim 1 wherein the engaged fastener holes are radially uniformly disposed from the axis of rotation.

3. The disk drive of claim 1 wherein the engaged fastener holes are radially non-uniformly disposed from the axis of rotation.

4. The disk drive of claim 3 wherein the engaged fastener holes are each disposed at a radial distance from the axis of rotation within ten percent deviation from a nominal radial distance of all of the engaged fastener holes from the axis of rotation.

5. The disk drive of claim 1 wherein the engaged fastener holes are disposed angularly non-uniformly about the axis of rotation.

6. The disk drive of claim 5 wherein adjacent pairs of the engaged fastener holes are each disposed at an angular distance with respect to the axis of rotation within fifteen percent deviation of a nominal angular distance of all of the engaged fastener holes with respect to the axis of rotation.

7. The disk drive of claim 1 wherein the spindle motor hub includes a plurality of threaded fastener openings aligned with the engaged fastener holes of the disk clamp for respectively engaging the fasteners for attachment of the disk clamp to the spindle motor hub.

8. A disk drive comprising:

a disk drive base;

a spindle motor hub rotatably coupled to the disk drive base, the spindle motor hub including a plurality of threaded fastener openings;

a disk disposed about the spindle motor hub;

a disk clamp attached to the spindle motor hub for securing the disk, the disk clamp including a plurality of engaged fastener holes formed through the disk clamp and aligned with the fastener openings of the spindle motor hub; and a plurality of fasteners respectively disposed through the engaged fastener holes for attaching the disk clamp and disk to the spindle motor hub, the fasteners being non-uniformly torqued with respect to each other within the fastener openings for applying a non-symmetric clamping force by the disk clamp against the disk.

* * * * *